Patented Dec. 5, 1933

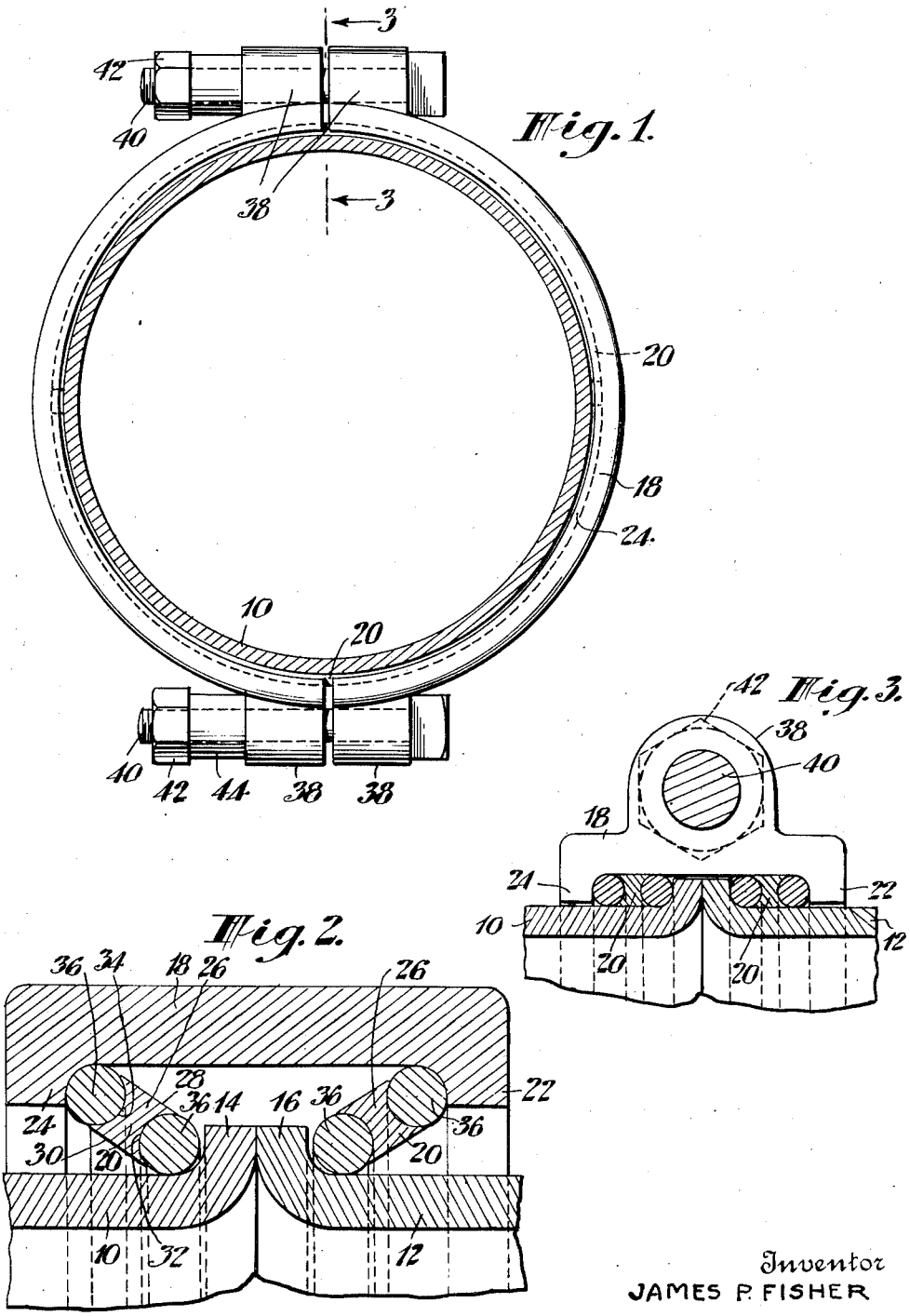

1,937,881

UNITED STATES PATENT OFFICE 1,937,881

PIPE JOINT

James P. Fisher, Bartlesville, Okla., assignor to Doherty Research Company, New York, N. Y., a corporation of Delaware Application January 15, 1931. Serial No. 508,929

9 Claims. (Cl. 285—129)

This invention relates to pipe joints, and more particularly to an improved coupling device adapted to form and hold a tight joint between the abutting outwardly flanged ends of coaxial pipe sections.

Objects of this invention are: to provide a pipe joint which is extremely simple in design and which can be rapidly and easily assembled; to provide a pipe joint requiring no heat in its assembly so that the metal parts of the joint remain uniform in structure, free from internal strains, and not subject to electrolytic corrosion; to provide a pipe joint having a strength against bursting and other strains at least equal to the strength of the individual pipe sections coupled at the joint; to provide a pipe joint which is made by a coupling operation performed altogether outside the pipe and which can be advantageously used in effecting the final sealed joint closure of a large long-distance pipe line; and to provide a pipe coupling for flanged pipe which can be easily broken at any time without changing the structure of the pipe flanges, thus making reassembly of the joint easy.

The pipe joint of the present invention is of the general type formed by coupling in tightly abutting relationship the outwardly flanged ends of two pipe sections. Important features of the present invention are the method and means employed for clamping the flanged ends of adjacent coaxial pipe sections together. Essentially, the means comprises a split clamping ring and two split toggle rings arranged to encircle the girth of the pipe at the joint. The joint is completed by contracting the clamping ring and thereby distorting the toggle rings into longitudinal alignment on opposite sides of the pipe joint, thus bringing heavy opposing pressures to bear through the toggle rings against the pipe flanges to hold the flanged ends of the pipes together to form a gas-tight joint. The design of the various elements of the coupling is such that the metal in the faces of the abutting pipe flanges may be subjected by the contraction of the clamping ring to a compression strain exceeding its elastic limit, thereby resulting in a unitary cold welded and sealed joint between the flanged ends of the adjacent pipe.

With the above and other objects and features in view, the invention consists in the improved pipe joint hereinafter described and more particularly defined in the claims.

The various features of the pipe joint forming the subject of the present invention are illustrated in a preferred form in the accompanying drawing, in which:

Fig. 1 is a cross-sectional view of the pipe, showing in elevation the clamping ring about the assembled pipe joint.

Fig. 2 is a longitudinal section of a part of the joint showing the pipe sections cut away and the parts of the coupling in place before being forced into final position.

Fig. 3 is a longitudinal section on the line 3—3 of Fig. 1 showing part of the completed joint.

Referring to the figures of the attached drawing, the joint of the present invention is made by flaring outwardly at a 90° angle the ends of two pipes 10 and 12 to be joined, and by coupling tightly together the two flanges 14 and 16 so formed. The coupling means consists essentially of a split clamping ring 18 and a pair of split toggle rings 20. The clamping ring and both toggle rings are preferably assembled from two or more annulus segments having a curvature corresponding substantially with the curvature of the outside walls of the pipes 10 and 12.

The flanged ends 14 and 16 of pipes 10 and 12 are of uniform thickness corresponding substantially to the wall thickness of the respective pipes, so that in the completed joint the thickness of metal at the circumferential joint between the pipe flanges is twice the wall thickness of each pipe. The flanges 14 and 16 extend outwardly beyond the outer circumference of the pipe a distance preferably slightly less than the wall thickness of the pipe. In other words the depth of the pipe flange is slightly less than its thickness.

The clamping ring and the toggle rings are designed with a simple section so that they can be produced by a rolling or drawing operation to a constant accurate dimension. The clamping ring 18 has an inverted channel section with flanges 22 and 24 turned inwardly toward the walls of pipes 10 and 12, the depth of the channel flanges corresponding with the depth of the pipe flanges 14 and 16 and being slightly less than the wall thickness of the pipes. The cross-sectional thickness of the clamping ring, both in the flanges and in the main channel section, is preferably greater than the wall thickness of the pipes and pipe flanges. It is desirable that the clamping ring have a strength against tension and shear stresses greater than the compression strength of the pipe flange and toggle rings. The width of the channel of the clamping ring between the flanges has an accurate dimension slightly less than twice the wall thickness of the pipe plus the width of one toggle ring.

The toggle rings in their original form have a frusto-conical shape when viewed in elevation and a substantially elliptical section, as illustrated in Fig. 2. The thickness of the toggle rings 20 preferably approximates the wall thickness of the pipes 10 and 12, so that with the toggle rings in compression to their yield point the clamping ring may be under a corresponding tension strain but below the yield point. While the toggle rings 20 in the unformed joint have an original shape conforming with the frustum of a cone, in the finished joint these same toggle rings have a shape conforming with a cylinder (Figs. 2 and 3). In other words, as manufactured the toggle ring sections have an edge bend and are frusto-conical in elevation, whereas in the completed joint the assembled toggle ring segments are cylindrical in elevation with the original edge bend straightened out. A considerable amount of work is necessary, therefore, in distorting the toggle rings from their original frusto-conical shape as manufactured, to the final cylindrical shape which they take in the completed joint. In order to facilitate the ease with which this distortion of the toggle rings may be effected, a special design of toggle ring is preferred constructed of three separate circular bands having cross sectional shapes and dimensions such that they may be clamped longitudinally together to form a single toggle ring unit or segment which can be readily bent edgewise to allow the distortion involved in making up the pipe joint. The construction of this preferred form of toggle ring consists essentially (Fig. 2) of a central longitudinal hoop 26 having parallel straight sides 28 and 30 and concave edges 32 and 34, together with two outer bands 36 of circular cross section and diameter corresponding to the thickness of the hoop section. The hoop and bands are clamped longitudinally together into a unitary toggle ring with the bands fitting into sockets formed by the concave edges of the hoop, thus forming slip planes in the friction joints between the outer rounded surfaces of the bands and the corresponding rounded concave edges of the hoop. With this type of toggle ring the amount of distortion stress required to change the shape of the toggle rings from that of a cone-frustum to that of a cylinder is greatly reduced by reason of the slip planes which are formed between the respective longitudinal sections of the toggle rings.

In Fig. 1 there is illustrated one form of means whereby the split ends of the clamping ring may be drawn together, or in other words the ring contracted to a smaller dimension. The bolt type of clamping ring joint which is illustrated in Fig. 1 resembles in design the eccentric strap which is commonly used in engine design. The essential elements of this bolted type clamping ring joint consists of lugs 38 constructed integral with the outer circumference of the clamping ring at the end of each clamping ring segment. Each of the lugs 38 has a cylindrical bore having a dimension adapted to accommodate a threaded bolt 40 of sufficient strength for use in drawing the clamping ring segments together against the resistance to distortion of the toggle rings. The bolts 40 are preferably of sufficient length not only to accommodate a nut 42, but also a collar 44 which serves to space the nut 42 from the lugs 38 and from the outer circumference of the clamping ring a distance sufficient to provide ready access to the nut during the clamping operation.

In assembling the elements of the coupling device together preparatory to completing a joint between adjacent pipe sections, the clamping and toggle rings are assembled as shown in Fig. 2 with the toggle rings encircling the pipes 10 and 12 on each side of the flanges 14 and 16, the rounded edges of each toggle ring being held lightly between the rounded base of one of the flanges of the clamping ring and the rounded base of the adjacent pipe flange, in the annular frusto-conical position shown. The clamping ring and both toggle rings are split or assembled from annulus segments, so that after being mounted in position around the girth of the pipes to be joined they can be forcibly contracted and distorted from their original shape and position as illustrated in Fig. 2, to a final shape and position as illustrated in Fig. 3.

In the clamping operation by which the clamping ring is contracted to form the joint, the drawing up of the nuts 42 on the bolts 40 places the clamping ring under a high circumferential tension strain. At the same time a compression strain of corresponding magnitude is set up, by the contraction of the clamping ring, along the major cross-sectional axis of each toggle ring, the lines of force of the opposing compression stresses causing this strain lying in frusto-conical surfaces extending between the points of contact of the toggle rings with the pipe flanges 14 and 16 and the toggle ring flanges 22 and 24. The drawing up of the nut 42 effects a gradual contraction of the clamping ring which in turn results in a gradual increase of the oblique angle made with the plane of the pipe joint by the lines of force transmitted through the toggle ring between the clamping ring and the pipe flanges. In the final completed pipe joint wherein the toggle rings have been distorted into a cylindrical shape tightly encircling the respective pipes forming the joint, it will be apparent that the lines of compression stress carried by the toggle rings between the clamping ring flanges and the pipe flanges lie 180° apart in a cylindrical surface-paralleling the outer circumference of the pipe and extending at right angles to the plane of the completed pipe joint and to the flanges of the clamping ring. Accordingly, in the finished pipe joint there are no stresses existing of a destructive nature, the joint having been made by a direct application of opposing compressive forces resulting from corresponding tension forces applied in a clamping ring having a simple channel form such that all the metal in it is usefully employed.

In the event that the amount of force which is required to contract the clamping ring to complete the pipe joint is greater than can be applied through a clamping device of the type illustrated, an external power mechanism may be used for compressing the clamping ring to the desired dimension. Moreover such power mechanism may be used in a manner such as to contract the ring into final position in a case where the tensile strength of the ring would be insufficient to complete the coupling operation by the application of tension strain to the ring as previously described.

After the clamping ring is once drawn to its final contracted position and the ends of its segment have been joined and fastened, it will be appreciated that in the completed pipe joint the clamping ring will have a low tension strain in a circumferential direction, and practically all of the strain on the ring and also on the other element of the pipe joint will be in a cylindrical surface paralleling the axis of the pipe itself. Regardless of the limitations in strength of metal in the several elements of the coupling device placing limits on their use in forming the joint, these limitations can be temporarily taken care of by outside mechanisms during the actual forming of the joint, and after the joint is completed and in its normal finished state, the stresses remaining in the joint and in the parts of the coupling device which are useful in holding the pipes together are all that must be taken care of in the original design of the coupling device.

In the completed joint the full section of the pipe walls at the joint is available, without initial stresses, to resist bursting at the joint, and in addition a very strong reinforcement is provided because of the additional strength of the clamping ring in tension. Moreover, since the toggle rings are designed with a strength and section substantially equal to that of the pipe, the pipe joint is not placed under any distortion strain until after the yield point of the toggle rings has been exceeded. By the substitution of new toggle rings for those which have been distorted, the joint can be broken and reassembled as many times as desired, and at very little cost. In case a joint is found insufficiently tight after assembly, it can be readily tightened by driving shims between the toggle rings and the pipe flanges to thereby add to the force of the toggle to close and seal the pipe joint. If in a particular case it should be found that the force required to contract the clamping ring to a circumferential dimension sufficient to distort the toggle joint to its finished position, is so great as to subject the ends of the pipe to crushing, this abnormal situation can be taken care of by placing a mandrel inside the pipes at the joint in position to support the pipe against the crushing effect of the clamping operation.

Because of the design of the various elements forming the coupling device of the present invention, very economical use is made of metal in forming the joint, so that the cost of a joint of predetermined strength is much below the average.

As previously indicated, the clamping ring and the toggle rings are accurately dimensioned and proportioned as regards the spacing of the clamping ring flanges, the width of the toggle rings, and the curvature of the toggle rings and of the rounded bases of the pipe and clamping ring flanges, so that undistorted full metallic contact between the rounded edges of the toggle rings and the rounded bases of the pipe and clamping ring flanges, will occur with the toggle rings not quite in line but approaching alignment with each other and with the pipe sections forming the joint. A great force is thus available for the final joint closing pressure and, since this force acts through a correspondingly small distance, it is possible with properly dimensioned equipment to compress the metal in the face of each abutting flange forming the pipe joint beyond its elastic limit. Moreover, by the previously indicated proportioning and dimensioning of the clamping ring and of the toggle rings with respect to the pipe and pipe flanges, the greater strength of the clamping ring section makes it possible to place the toggle rings in compression above their yield point, without placing the clamping ring in tension above its yield point.

The invention having been thus described, what is claimed as new is:

1. A coupling for forming and holding a tight joint between abutting outwardly flanged ends of coaxial pipe sections comprising, a segmented clamping ring of channel section encircling the pipe joint and having flanges turned inwardly toward the pipe and equally spaced from the pipe flanges, a pair of split toggle rings, originally frusto-conical in elevation and substantially elliptical in section, each encircling one pipe section and held lightly in angular position between the base of one flange of the clamping ring and the base of the adjacent pipe flange, and means for drawing together the joints between clamping ring segments and thereby distorting the toggle rings into a cylindrical shape tightly fitting the space between each clamping ring flange and the adjacent pipe flange.

2. A coupling for forming and holding a tight joint between the abutting outwardly flanged ends of coaxial pipe sections, comprising, a split clamping ring of channel section encircling the pipe flanges and having flanges turned inwardly toward the pipe and spaced from and paralleling the pipe flanges, a pair of split toggle rings, originally frusto-conical in elevation and substantially elliptical in section, each mounted with its major cross sectional axis extending at an oblique angle between the base of one flange of the clamping ring and the base of the adjacent pipe flange, and means for drawing the ends of the clamping ring together and thereby impressing a compression strain on each toggle ring of sufficient magnitude to distort the toggle ring into a cylindrical shape with its major cross-sectional axis extending at right angles between the clamping ring flange and the pipe flange.

3. A coupling of the type defined in claim 2 in which the clamping ring is of substantially stronger section than the pipe and pipe flanges.

4. A coupling of the type defined in claim 2 in which each toggle ring comprises a central split hoop having parallel sides and concave edges and two split bands of circular cross-section and diameter the same as the thickness of the hoop, said hoop and bands being clamped longitudinally together to form a toggle ring having slip planes between the concave edges of the hoop and the band sections.

5. A coupling as defined in claim 2 in which the pipe flanges and the flanges of the clamping ring are of substantially uniform depth less than the thickness of the toggle rings, and in which the bases of the pipe flanges and of the clamping ring flanges are rounded to conform with the rounded edges of the toggle rings.

6. A pipe joint of the type described, comprising, a pair of coaxial abutting, outwardly flanged pipe ends, and a coupling forming and holding said pipe ends together, comprising a pair of toggle rings originally frusto-conical in elevation and substantially elliptical in section, each mounted with one rounded edge encircling one pipe end at the base of the flange and its major cross-sectional axis extending outwardly at an oblique angle with the flange, each toggle ring having a thickness greater than the depth of the pipe flange which it engages, and a clamping device for impressing high compression stresses along the major cross-sectional axis of each toggle ring tending to force said pipe flanges together and to gradually distort said toggle rings into the form of cylindrical collars having their major cross-sectional axes at right angles to the pipe flanges, said device comprising a split clamping ring of inverted channel section, of strength greater than that of the toggle rings and pipe flanges and with flanges of substantially the same depth as the pipe flanges, said clamping ring encircling and spaced from the ends of the pipe flanges and having a width between flanges slightly less than twice the combined width of each toggle ring and thickness of each pipe flange, and means for gradually contracting the clamping ring from a position in which the rounded edges of each toggle ring of frusto-conical shape lightly contacts the inner base of one of the two clamping ring flanges to a final position in which each toggle ring in distorted cylindrical shape tightly engages at 90° angles the adjacent clamping ring and pipe flanges.

7. The method of forming and holding a gastight circumferential joint between the outwardly flanged abutting ends of two coaxial pipes which comprises, applying heavy opposing pressures against the flanged ends of both pipes along a circumferential line in the outer face of a flange which gradually shifts in location from the base toward the edge of the flange, and in lines of force lying at gradually increasing oblique angles with respect to the flange, and finally compressing the flanged ends into a unitary joint and holding them under a high compression strain paralleling the axis of the pipes and under a zero tension strain in a circumferential direction.

8. The method of forming and holding a unitary joint between coaxial abutting flanged pipe ends which comprises, impressing circumferential opposing compressive force against the outer faces of the said pipe flanges in lines of force lying in imaginary surfaces forming successively increasing oblique angles with respect to each other and intersecting the outer face of each of said pipe flanges in a circumferential line gradually shifting in location from the base toward the periphery of the flange, until the lines of force bearing against the pipe flanges lie in a cylindrical surface paralleling the axis of the pipes, and holding the resulting joint under a zero tension strain in a circumferential direction.

9. A coupling for forming and holding a tight joint between abutting outwardly flanged ends of coaxial pipe sections comprising, a toggle ring originally frusto-conical in elevation and substantially elliptical in section adapted to encircle one pipe section in angular position for mounting with an inner edge bearing lightly against the base of the adjacent pipe flange, and means adapted for applying pressure to the outer edge of such toggle ring thus mounted in the direction of its major axis and for simultaneously applying an opposing pressure to the flange which said ring does not engage, to thereby distort the ring into a cylindrical shape tightly encircling the first-mentioned pipe section and to draw and hold the ring and flanges in tight engagement.

JAMES P. FISHER.